(12) United States Patent
Kimura

(10) Patent No.: US 8,929,590 B2
(45) Date of Patent: Jan. 6, 2015

(54) OBJECT TRACKING DEVICE CAPABLE OF TRACKING OBJECT ACCURATELY, OBJECT TRACKING METHOD, AND STORAGE MEDIUM

(75) Inventor: Naoto Kimura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 18 days.

(21) Appl. No.: 13/302,476

(22) Filed: Nov. 22, 2011

(65) Prior Publication Data

US 2012/0134538 A1 May 31, 2012

(30) Foreign Application Priority Data

Nov. 25, 2010 (JP) ................................. 2010-262514

(51) Int. Cl.
*G06K 9/00* (2006.01)
*G06T 7/20* (2006.01)

(52) U.S. Cl.
CPC ............ *G06K 9/00261* (2013.01); *G06T 7/204* (2013.01)
USPC .......................................................... 382/103

(58) Field of Classification Search
None
See application file for complete search history.

(56) References Cited

U.S. PATENT DOCUMENTS

2008/0095399 A1* 4/2008 Cui et al. ....................... 382/103
2008/0252723 A1* 10/2008 Park ............................... 348/143

FOREIGN PATENT DOCUMENTS

| JP | 05-030406 A | 2/1993 |
| JP | 2009-069748 A | 4/2009 |
| JP | 2009-225236 A | 10/2009 |

OTHER PUBLICATIONS

Japanese Office Action for corresponding JP2010-262514, mail date Jun. 24, 2014.

* cited by examiner

*Primary Examiner* — Stephen R Koziol
*Assistant Examiner* — Amandeep Saini
(74) *Attorney, Agent, or Firm* — Rossi, Kimms & McDowell LLP

(57) ABSTRACT

An object tracking device capable of accurately tracking an object as a tracking target. The device receives an image signal having a plurality of frame images and tracks a specific object in the image signal. The device sets a predetermined number of small areas in a reference area indicative of an area where an image of the object is formed in the preceding frame image. The object tracking device detects a motion vector of the object in each of the small areas, and determines a change of the object according to the motion vector to thereby obtain shape change information. The device corrects the location and size of the reference area according to the shape change information to thereby correct the reference area to a corrected reference area, and tracks the object using the corrected reference area.

6 Claims, 15 Drawing Sheets

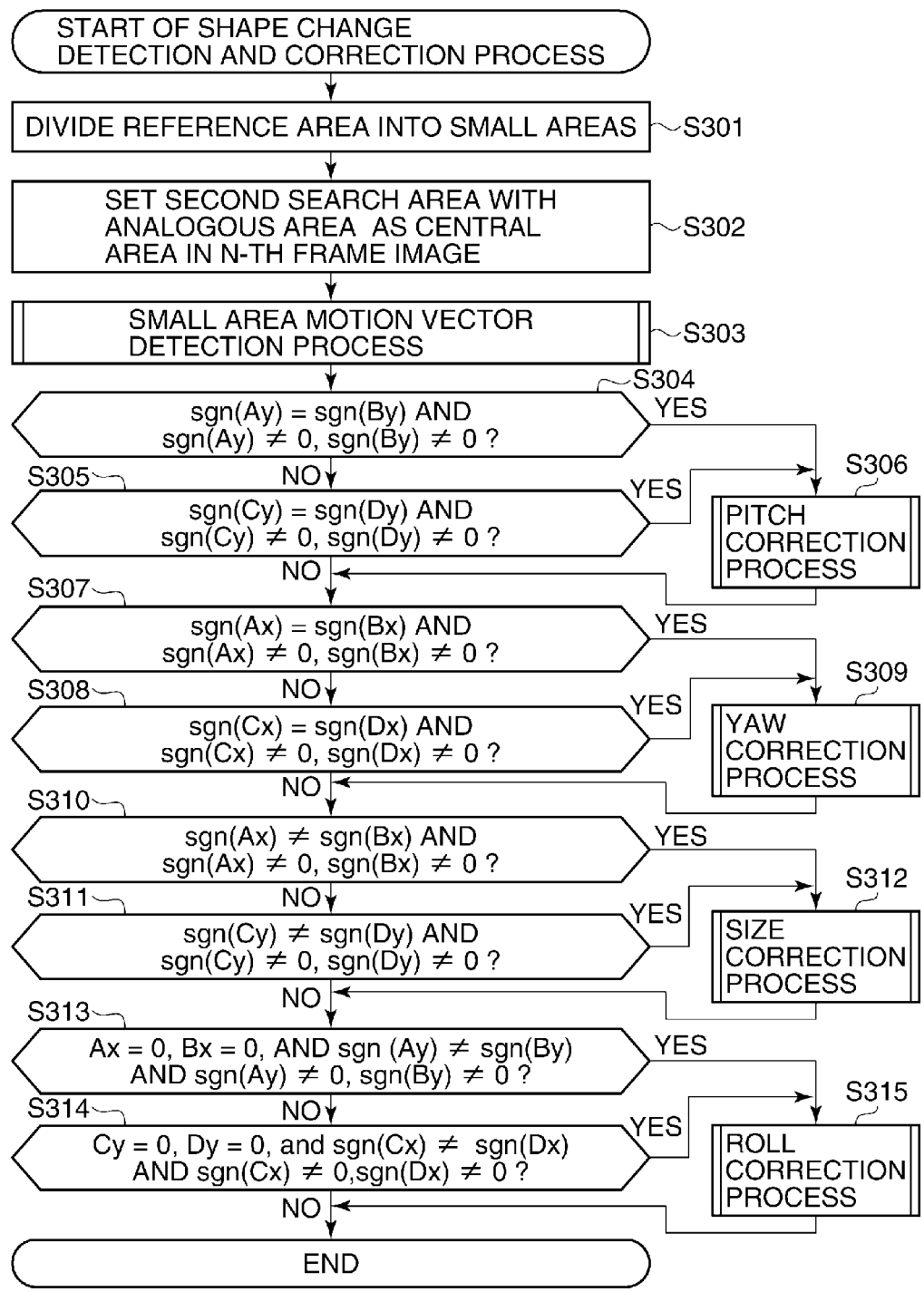

OBJECT TRACKING DEVICE CAPABLE OF TRACKING OBJECT ACCURATELY, OBJECT TRACKING METHOD, AND STORAGE MEDIUM

BACKGROUND OF THE INVENTION

1. Field of the Invention

The present invention relates to an object tracking device used in an image pickup apparatus, such as a camera, to track an object, an object tracking method, and a storage medium storing an object tracking program, and more particularly to an object tracking device for use with automatized functions, such as the autofocus function and the exposure correction function, an object tracking method, and a storage medium storing an object tracking program.

2. Description of the Related Art

In general, an image pickup apparatus, such as a camera, is provided with an object tracking device for tracking an object. In the image pickup apparatus, an object image in a moving image is tracked according to the feature value of the object image.

For example, the feature value of an object image is calculated from a reference area, where the object image exists (i.e. the object image is formed), in a frame (preceding frame) preceding the current frame in time. Then, a predetermined search area in the present frame is searched for an area in which a feature value calculated therefrom is most approximate to the feature value calculated from the reference area in the preceding frame. Then, based on a result of the search, a reference area in the current frame is determined.

Further, in tracking an object, it is a known practice to move a reference area on a frame-by-frame basis and correct the location and size of the reference area so as to cope with deformation and turn of the object.

In Japanese Patent Laid-Open Publication No. 2009-225236, the reference area is corrected when the size of an object changes. For example, when the zoom magnification of an optical system is changed, the feature of the reference area is searched for while increasing or reducing the reference area according to the amount of change in the zoom magnification, whereby the reference area is corrected.

Further, in Japanese Patent Laid-Open Publication No. H05-30406, the reference area is corrected based on detection of motion vectors. For example, a plurality of auxiliary areas are set outside the reference area, and a motion vector is detected in association with each of the areas. Then, an auxiliary area where a motion vector approximately equal to a motion vector detected in association with the reference area was found is selected, and the reference area is relatively moved toward the selected auxiliary area, whereby the reference area is corrected.

In Japanese Patent Laid-Open Publication No. 2009-225236, however, when zoom operation is not performed, i.e. when an object changes its size as it comes closer to the camera, it is impossible to correct the reference area, so that the object as a tracking target cannot be tracked with high accuracy.

On the other hand, in Japanese Patent Laid-Open Publication No. H05-30406, although prevention of erroneous detection of a motion vector is disclosed, when the shape of an object is changed e.g. due to a turn of the object or a change in the size of the object, it is impossible to perform correction as desired, so that the object as a tracking target cannot be tracked accurately.

SUMMARY OF THE INVENTION

The present invention provides an object tracking device which is capable of accurately tracking an object as a tracking target even when the state (shape) of the object changes, an object tracking method, and a storage medium storing an object tracking program.

In a first aspect of the present invention, there is provided an object tracking device that receives an image signal having a plurality of frame images and tracks a specific object in the image signal, comprising a small area-setting unit configured to set a predetermined number of small areas in a reference area indicative of an area where an image of the object is formed in a preceding frame image preceding a current frame image, a motion vector detection unit configured to detect a motion vector of the object in each of the small areas, a shape change determination unit configured to determine a change of the object according to the motion vector to thereby obtain shape change information, an area correction unit configured to correct a location and a size of the reference area according to the shape change information to thereby correct the reference area to a corrected reference area, and a tracking unit configured to track the object using the corrected reference area.

In a second aspect of the present invention, there is provided an object tracking method for use in an object tracking device that receives an image signal having a plurality of frame images and tracks a specific object in the image signal, comprising setting a predetermined number of small areas in a reference area indicative of an area where an image of the object is formed in a preceding frame image preceding a current frame image, detecting a motion vector of the object in each of the small areas, determining a change of the object according to the motion vector to thereby obtain shape change information, correcting a location and a size of the reference area according to the shape change information to thereby correct the reference area to a corrected reference area, and tracking the object using the corrected reference area.

In a third aspect of the present invention, there is provided a non-transitory computer-readable storage medium storing a computer-executable object tracking program for causing a computer to execute an object tracking method for use in an object tracking device that receives an image signal having a plurality of frame images and tracks a specific object in the image signal, wherein the object tracking method comprises setting a predetermined number of small areas in a reference area indicative of an area where an image of the object is formed in a preceding frame image preceding a current frame image, detecting a motion vector of the object in each of the small areas, determining a change of the object according to the motion vector to thereby obtain shape change information, correcting a location and a size of the reference area according to the shape change information to thereby correct the reference area to a corrected reference area, and tracking the object using the corrected reference area.

According to the present invention, it is possible to track an object with high accuracy even when the state of the object changes.

Further features of the present invention will become apparent from the following description of exemplary embodiments with reference to the attached drawings.

BRIEF DESCRIPTION OF THE DRAWINGS

FIGS. 5A and 5B are views useful in explaining how coordinate values of an analogous area in an N-th frame image are determined by the tracking section appearing in FIG. 1, in which FIG. 5A shows a (N-1)-th frame image, and FIG. 5B shows an N-th frame image.

FIG. 6 is a flowchart of a shape change detection and correction process executed in the tracking process in FIG. 2.

FIGS. 7A to 7D are views useful in explaining division into small areas which is performed by a small area-setting section appearing in FIG. 1, in which FIG. 7A shows a case where a reference area is vertically divided in the (N-1)-th frame image, FIG. 7B shows the N-th frame image corresponding to FIG. 7A, FIG. 7C shows a case where the reference area is horizontally divided in the (N-1)-th frame image, and FIG. 7D shows the N-th frame image corresponding to FIG. 7C.

FIGS. 9A to 9C are views of examples of respective turning directions of an object, in which FIG. 9A shows an example of a turn in a yaw direction of the object, FIG. 9B shows an example of a turn in a pitch direction of the object, and FIG. 9C shows an example of a turn in a roll direction of the object.

FIGS. 10A to 10H are views useful in explaining how a shape change determination section appearing in FIG. 1 performs determination as to a shape change, in which FIG. 10A shows motion vectors detected in association with small vertically divided areas when the object is performing a turn in the pitch direction thereof, FIG. 10B shows motion vectors detected in association with small horizontally divided areas when the object is performing a turn in the pitch direction thereof, FIG. 10C shows motion vectors detected in association with the small vertically divided areas when the object is performing a turn in the yaw direction thereof, FIG. 10D shows motion vectors detected in association with the small horizontally divided areas when the object is performing a turn in the yaw direction thereof, FIG. 10E shows motion vectors detected in association with the small vertically divided areas when the size of the object is changing, FIG. 10F shows motion vectors detected in association with the small horizontally divided areas when the size of the object is changing, FIG. 10G shows motion vectors detected in association with two of the small vertically divided areas when the object is performing a turn in the roll direction thereof, and FIG. 10H shows motion vectors detected in association with two of the small horizontally divided areas when the object is performing a turn in the roll direction thereof.

FIGS. 12A to 12F are views of motion vectors calculated before execution of a pitch correction process appearing in FIG. 6, in which FIG. 12A shows a case where two motion vectors have the same sign (positive), FIG. 12B shows a case where two motion vectors different from the motion vectors shown in FIG. 12A have the same sign (negative), FIG. 12C shows a case where the four motion vectors have the same sign (positive), FIG. 12D shows a case where the four motion vectors have the same sign (negative), FIG. 12E shows a case where two motion vectors have the same sign (positive) and the other two have the different sign (negative), and FIG. 12F shows a state opposite to that in FIG. 12E.

DESCRIPTION OF THE EMBODIMENTS

The present invention will now be described in detail below with reference to the accompanying drawings showing an embodiment thereof.

Figure 1:
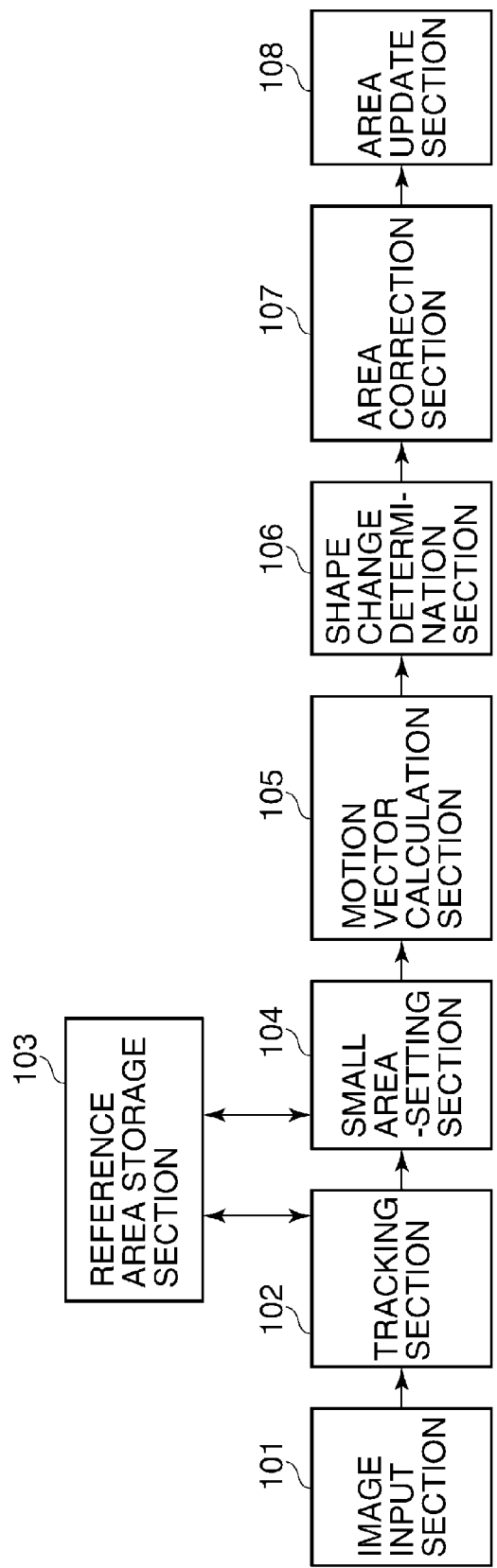
FIG. 1 is a block diagram of an object tracking device according to an embodiment of the present invention.

FIG. 1 is a block diagram of an object tracking device according to the embodiment of the present invention.

Referring to FIG. 1, the object tracking device is provided e.g. in an image pickup apparatus, such as a digital camera. The object tracking device tracks an object as a tracking target in a moving image.

The object tracking device comprises an image input section 101, a tracking section 102, a reference area storage section 103, a small area-setting section 104, a motion vector calculation section 105, a shape change determination section 106, an area correction section 107, and an area update section 108. The image input section 101 is for inputting moving image data obtained through shooting e.g. by a digital camera, as an image signal.

The tracking section 102, the small area-setting section 104, the motion vector calculation section 105, the shape change determination section 106, the area correction section 107, and the area update section 108 correspond to respective functions provided e.g. by a microprocessor (not shown) of the digital camera. In other words, the tracking section 102, the small area-setting section 104, the motion vector calculation section 105, the shape change determination section 106, the area correction section 107, and the area update section 108 are realized by executing an object tracking program on the microprocessor. Note that the reference area storage section 103 is formed e.g. by a memory provided in the digital camera.

The reference area storage section 103 stores location information indicative of a reference area (also referred to as an object area) used as a reference for tracking a specific object in an (N-1)-th frame (N: integer≥2) (i.e. in a preceding frame image) and image data associated with the reference area. The tracking section 102 receives an image signal from the image input section 101. The tracking section 102 refers to the reference area storage section 103 and searches for a location where a main object formed in the reference area in the (N-1)-th frame is formed in an N-th frame (i.e. the current frame) that follows the (N-1)-th frame, whereby an analogous area most similar to the reference area is obtained.

The small area-setting section 104 refers to the reference area storage section 103 and sets a predetermined (preset) number of small areas in the reference area (i.e. the object area) in the (N-1)-th frame. The motion vector calculation section 105 detects respective motion vectors associated with the small areas. The shape change determination section 106 determines a change in the shape of a main object as a tracking target based on the motion vectors to thereby obtain shape change information.

The area correction section 107 corrects the location and size of the analogous area determined by the tracking section 102, based on a result of determination by the shape change determination section 106, to thereby determine a corrected object area (also referred to as "a corrected reference area" or "corrected object area"). Then, the area update section 108 updates the reference area in the current frame to the analogous area (corrected analogous area) corrected by the area correction section 107.

Figure 2:
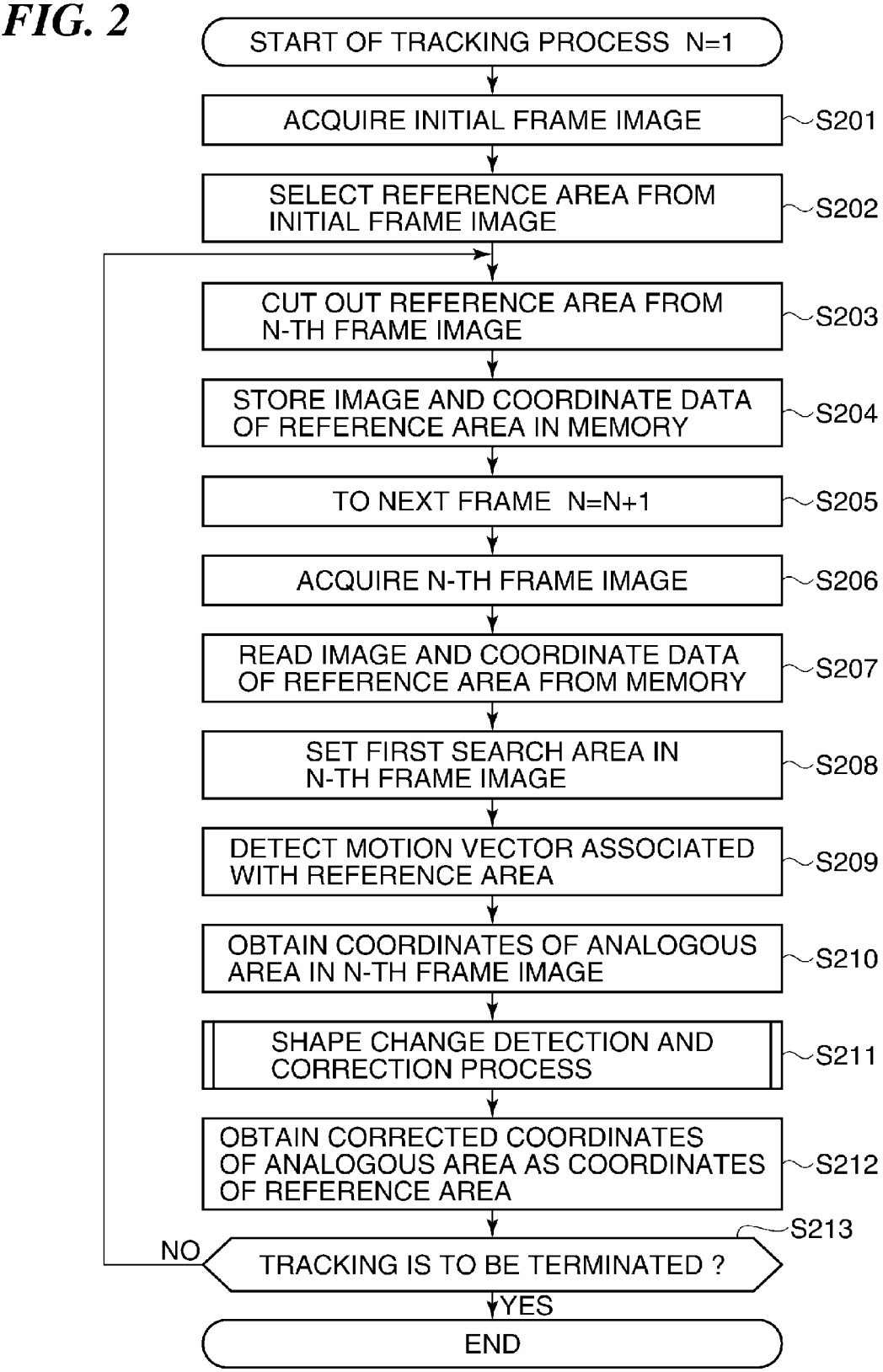
FIG. 2 is a flowchart of a tracking process executed by the object tracking device shown in FIG. 1.

FIG. 2 is a flowchart of a tracking process executed by the object tracking device shown in FIG. 1.

Referring to FIGS. 1 and 2, when a user touches an object to be tracked on a screen displayed on a touch-panel-equipped display section (not shown) of the digital camera, the object tracking device starts tracking of the touched object as a tracking target.

When the tracking is started, the tracking section 102 acquires initial frame image data from the image input section 101, by setting a variable N to 1 (step S201). Then, the tracking section 102 sets an area to be used as a reference for tracking, as a reference area, such that the area covers the object to be tracked in the initial frame image (step S202).

The reference area may have a preset range, or alternatively, a variable range so as to make it easy to track the object through image analysis or the like from a position selected by the user. Further, the reference area may be automatically set to a face area detected by a face detection function provided in the digital camera.

Figure 3:
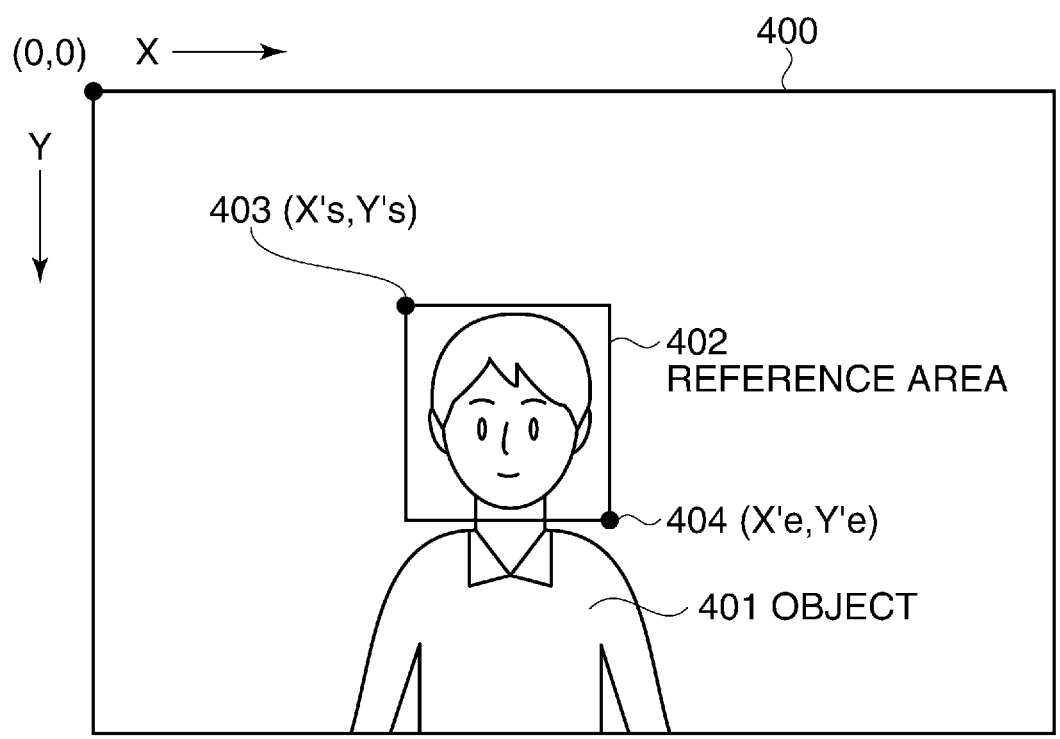
FIG. 3 is a view useful in explaining how a reference area is set by a tracking section appearing in FIG. 1.

FIG. 3 is a view useful in explaining how the reference area is set by the tracking section 102 appearing in FIG. 1.

As shown in FIG. 3, in an initial frame 400, the location of a reference area 402 for an object image (hereinafter simply referred to "the object" as well) 401 as a tracking target is represented by upper left coordinates 403 (X's, Y's) and lower right coordinates 404 (X'e, Y'e). The upper left coordinates and lower right coordinates necessary for representing the location of a reference area are hereinafter referred to as coordinate data.

Referring again to FIGS. 1 and 2, the tracking section 102 cuts out an image of the reference area from the N-th frame image based on the coordinate data in the initial frame, and sets the cut-out image as a reference area image (step S203).

Then, the tracking section 102 stores the reference area image and the coordinate data associated with the N-th frame in the storage section (memory) 103 (step S204). The reference area image and the coordinate data are used as a reference for searching for an object as a tracking target in the next frame. Then, the tracking section 102 updates the variable N to N+1 (N=N+1) and performs processing for proceeding to a next frame image (step S205).

Next, the tracking section 102 acquires the N-th frame image to be processed as the current frame image, from the image input section 101 (step S206). Then, the tracking section 102 reads the reference area image and the coordinate data from the memory (step S207), and sets an area for searching for the object as a tracking target in the current frame image, as a search area (step S208). In the following, this search area will be referred to as "the first search area".

Figure 4:
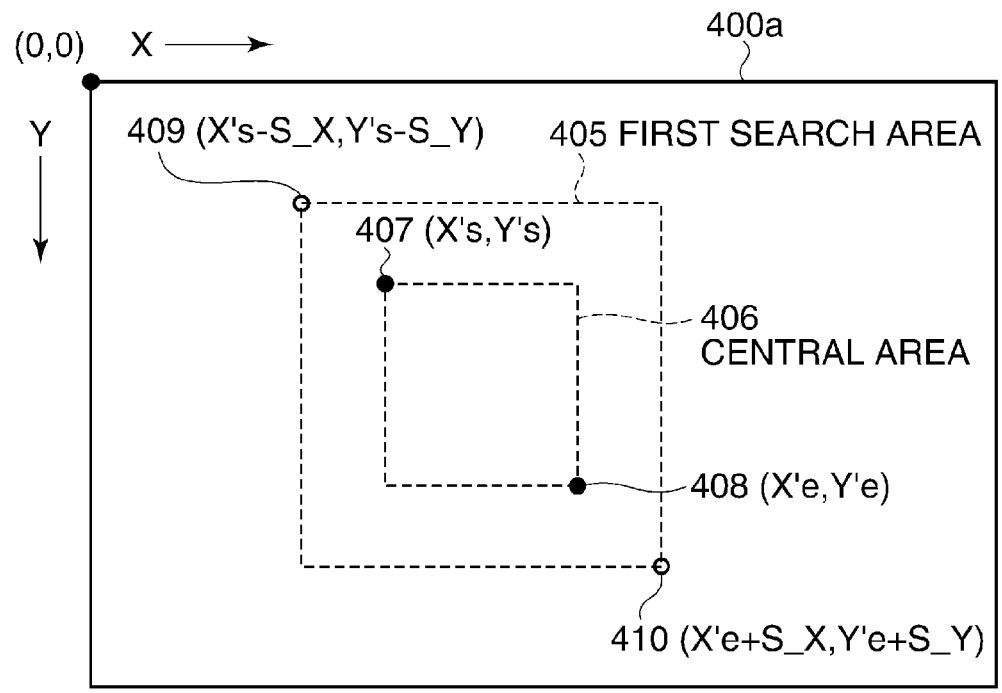
FIG. 4 is a view useful in explaining how a first search area is set by the tracking section.

FIG. 4 is a view useful in explaining how the first search area is set by the tracking section 102 appearing in FIG. 1.

As shown in FIG. 4, the location of an area 406 as a central portion of a first search area 405 in an N-th frame image 400a is represented by upper left coordinates 407 (X's, Y's) and lower right coordinates 408 (X'e, Y'e). In the following, the central portion of the first search area 405 in the N-th frame image 400a will be referred to as the central area.

The first search area 405 in the N-th frame image 400a is set by defining, with reference to the location of the central area 406, upper left coordinates 409 (X's−S_X, Y's−S_Y) and lower right coordinates 410 (X'e+S_X, Y'e+S_Y) according to first search reference values S_X and S_Y.

Referring again to FIGS. 1 and 2, the tracking section 102 searches the first search area 405 set in the N-th frame image 400a for an area most approximate in feature value to the reference area stored in the memory, and calculates a motion vector indicative of a motion from the reference area to the area most approximate in feature value thereto (step S209). Note that as the feature value, there may used e.g. a pixel value or a histogram.

Then, the tracking section 102 adds components of the motion vector to the coordinate data of the reference area to thereby obtain the location (coordinates) of the area most approximate in feature value to the reference area (step S210). In the following, the area having a feature value most approximate to that of the reference area will be referred to as the analogous area.

Figure 5A:
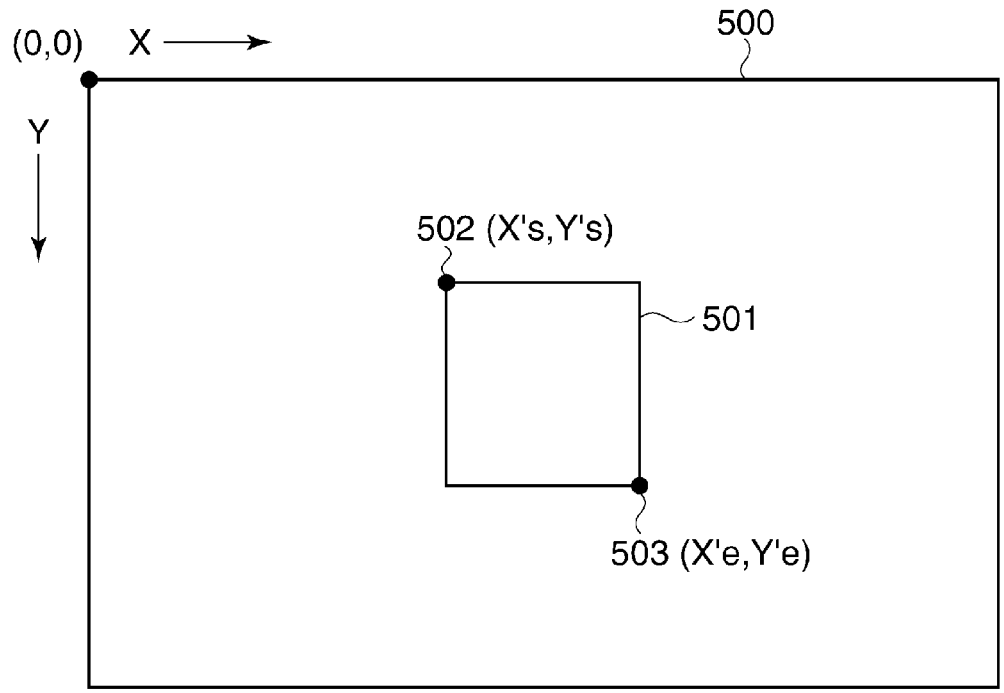
Figure 5B:
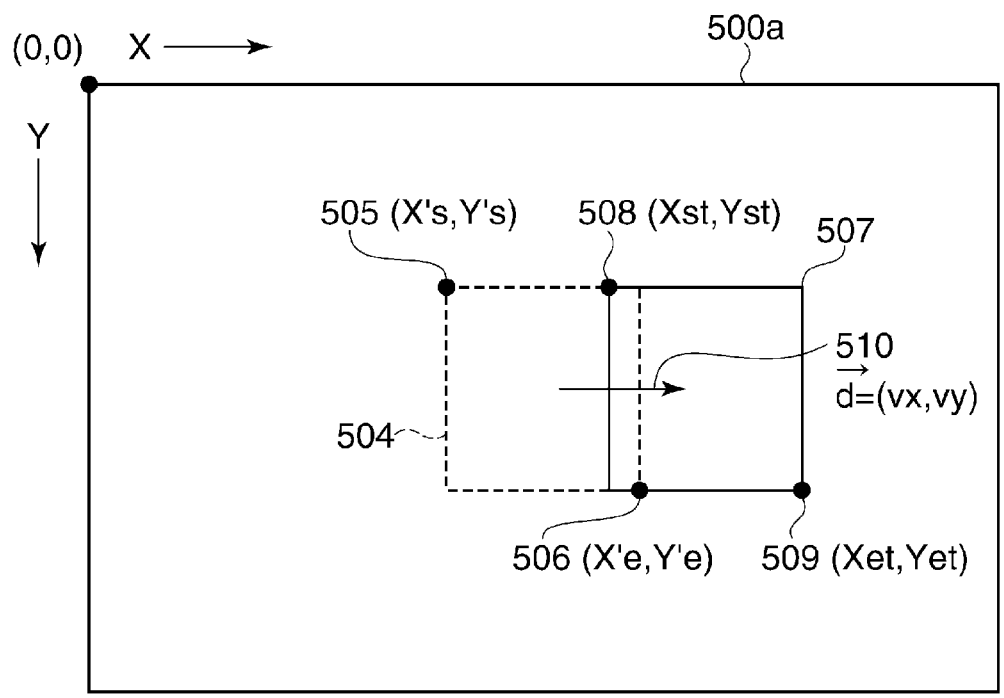

FIGS. 5A and 5B are views useful in explaining how the coordinates of the analogous area in the N-th frame image are determined by the tracking section 102 appearing in FIG. 1. FIG. 5A shows a (N-1)-th frame image, and FIG. 5B shows the N-th frame image.

As shown in FIG. 5A, the location of a reference area 501 in the (N-1)-th frame image 500 is represented by upper left coordinates 502 (X's, Y's) and lower right coordinates 503 (X'e, Y'e). Similarly, as shown in FIG. 5B, the location (coordinates) of a central area 504 in an N-th frame image 500a is represented by upper left coordinates 505 (X's, Y's) and lower right coordinates 506 (X'e, Y'e).

Components $\vec{d}=(vx, vy)$ of a motion vector 510 calculated by the following equations (1) are added to the upper left coordinates 505 (X's, Y's) and the lower right coordinates 506 (X'e, Y'e) representing the location of the central area 504:

$$(Xst, Yst)=(X's+vx, Y's+vy)$$

$$(Xet, Yet)=(X'e+vx, Y'e+vy) \quad (1)$$

whereby the location of an analogous area 507 in the N-th frame image 500a is represented by upper left coordinates 508 (Xst, Yst) and lower right coordinates 509 (Xst, Yet).

Then, in the object tracking device, a change in the shape of the analogous area is detected and the analogous area is corrected (step S211), as described hereinafter, whereby the corrected location of the analogous area is determined as new coordinate data of the reference area (step S212). Then, the object tracking device determines whether or not to terminate the tracking in the N-th frame image (step S213). If the tracking is not to be terminated (NO to the step S213), the process returns to the step S201, and the object tracking device performs tracking processing for the next frame. On the other hand, if the tracking is to be terminated (YES to the step S213), the object tracking device terminates the object tracking.

Next, a detailed description will be given of the process executed in the step S211 in FIG. 2.

FIG. 6 is a flowchart of the shape change detection and correction process executed in the step S211 of the tracking process in FIG. 2.

Referring to FIGS. 1 and 6, the small area-setting section 104 reads out the reference area from the reference area storage section (memory) 103 and divides the reference area into a plurality of small areas (step S301). In the present embodiment, the small area-setting section 104 vertically divides the reference area into two small vertically divided areas, and horizontally divides the reference area into two small horizontally divided areas.

Then, the motion vector calculation section 105 sets a search area with the analogous area as its central portion, so as to perform motion vector detection for the small areas set by the small area-setting section 104 (step S302). In the following, this search area will be referred to as the second search area.

Figure 7A:
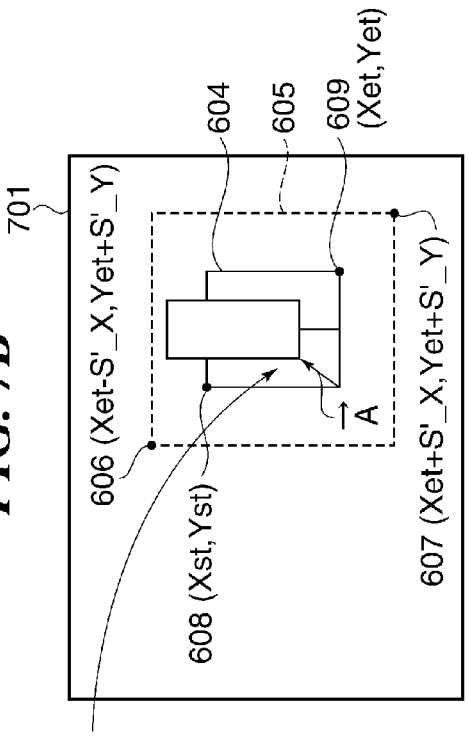
Figure 7B:
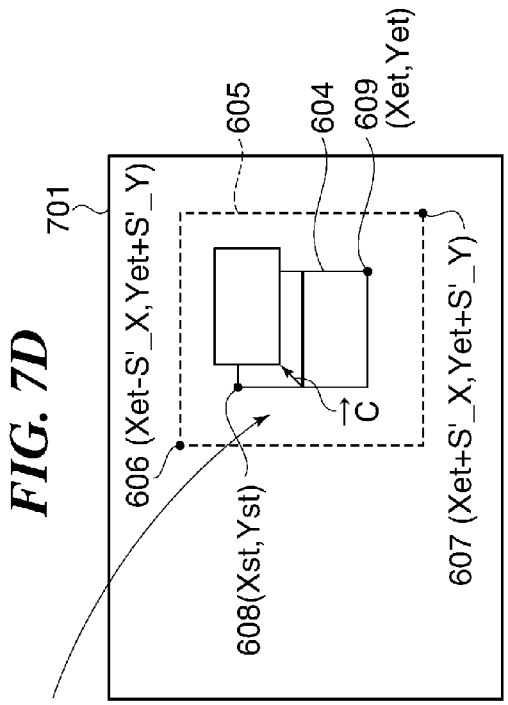
Figure 7C:
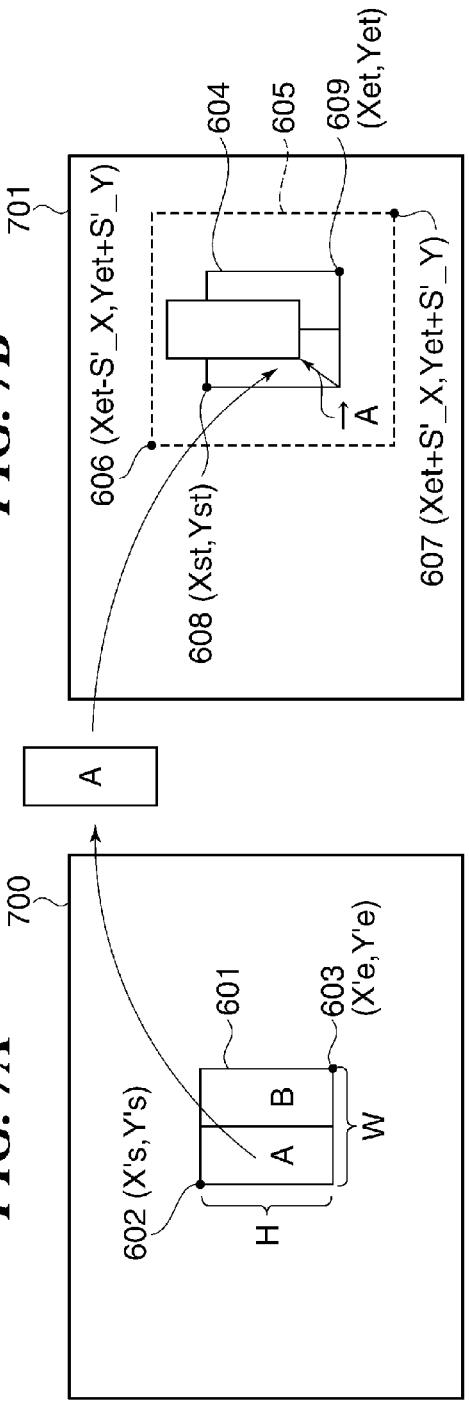
Figure 7D:
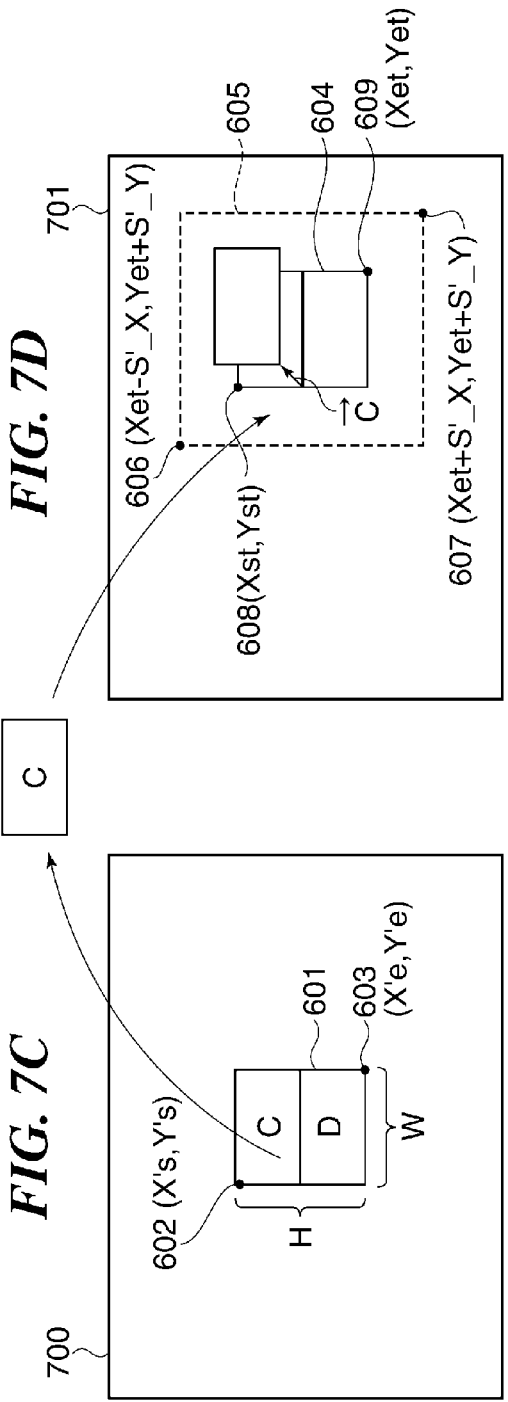

FIGS. 7A to 7D are views useful in explaining division into small areas performed by the small area-setting section 104 appearing in FIG. 1. FIG. 7A shows a case where the reference area is vertically divided in the (N-1)-th frame image, and FIG. 7B shows the N-th frame image corresponding to FIG. 7A. FIG. 7C shows a case where the reference area is horizontally divided in the (N-1)-th frame image, and FIG. 7D shows the N-th frame image corresponding to FIG. 7C.

As shown in FIG. 7A, in the (N-1)-th frame image, denoted by reference numeral 700, the location of a reference area 601 is represented by start coordinates 602 (X's, Y's) and end coordinates 603 (X'e, Y'e). The reference area 601 is vertically divided into two small areas (small vertically divided areas) (in FIG. 7A, the small areas are denoted by symbols "A" and "B"). Each of the small areas A and B has a horizontal width of W/2 and a vertical width of H. That is, the two small areas A and B are equal in area to each other.

As shown in FIG. 7B, in the N-th frame image, denoted by reference numeral 701, the location of an analogous area 604 is represented by start coordinates 608 (Xst, Yst) and end coordinates 609 (Xet, Yet). The location of a second search area 605 is set, with the analogous area 604 in its central portion, by defining upper left coordinates 606 (Xst−S'_X, Yst−S'_Y) and lower right coordinates 607 (Xet+S'_X, Yet+S'_Y) based on second search reference values S'_X and S'_Y.

In the illustrated example, the first search reference values S_X and S_Y are used as the respective second search reference values S'_X and S'_Y, as expressed by the following equations (2):

$$S'\_X=S\_X$$

$$S'\_Y=S\_Y \qquad (2)$$

Similarly, as shown FIG. 7C, in the (N-1)-th frame image 700, the reference area 601 is horizontally divided into two small areas (small horizontally divided areas) (in FIG. 7C, the small areas are denoted by symbols "C" and "D"). Each of the small areas C and D has a horizontal width of W and a vertical width of H/2. That is, the two small areas C and D are equal in area to each other.

As shown in FIG. 7D, in the N-th frame image 701, the location of the second search area 605 is set, with the analogous area 604 in its central portion, by defining the upper left coordinates 606 (Xst−S'_X, Yst−S'_Y) 606 and the lower right coordinates 607 (Xet+S'_X, Yet+S'_Y) based on the second search reference values S'_X, S'_Y.

The motion vector calculation section 105 calculates motion vectors indicative of respective motions from the small areas A and B obtained by vertically dividing the reference area 601 to respective areas most approximate in feature value thereto in the second search area 605 set as described above (step S303). Further, the motion vector calculation section 105 calculates motion vectors indicative of respective motions from the small areas C and D obtained by horizontally dividing the reference area 601 to respective areas most approximate in feature value thereto in the second search area 605, (step S303).

Now, a description will be given of detection of motion vectors associated with the small areas A to D.

Each of the motion vectors $\vec{A}, \vec{B}, \vec{C}$, and $\vec{D}$ detected in association with the respective small areas A to D has an x component and a y component as expressed by the following equations (3):

$$\vec{A}=(Ax, Ay)$$

$$\vec{B}=(Bx, By)$$

$$\vec{C}=(Cx, Cy)$$

$$\vec{D}=(Dx, Dy) \qquad (3)$$

Figure 8:
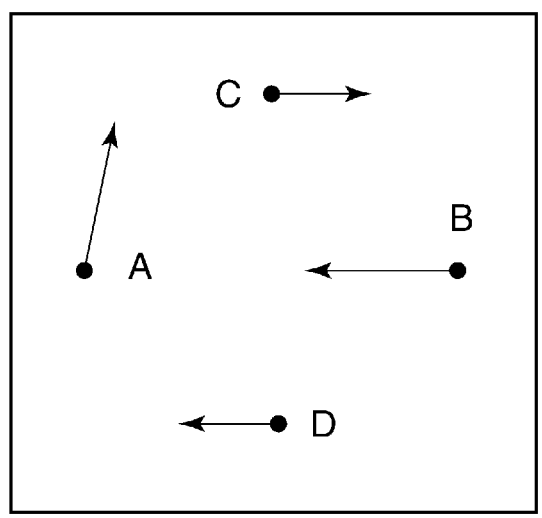
FIG. 8 is a view showing an example of motion vectors associated with respective small areas described with reference to FIGS. 7A to 7D.

FIG. 8 is a view showing an example of motion vectors associated with the respective small areas A to D described with reference to FIGS. 7A to 7D. Here, the motion vectors $\vec{A}, \vec{B}, \vec{C}$, and $\vec{D}$ detected in the respective small areas A to D are denoted by A to D, as shown in FIG. 8, respectively, and referred to hereinafter as the motion vectors A to D, respectively.

Then, the shape change determination section 106 performs determination as to a direction in which the object has turned and a change in the size of the object, according to the components of the motion vectors A to D detected in association with the respective small areas A to D. Further, the area correction section 107 performs a correction process for correcting the analogous area according to a result of the determination.

In the illustrated example, the shape change determination section 106 performs the determination using a sign function expressed by the following equation (4):

$$\mathrm{sgn}(x) = \begin{cases} 1 : x > 0 \\ 0 : x = 0 \\ -1 : x < 0 \end{cases} \qquad (4)$$

Figure 9A:
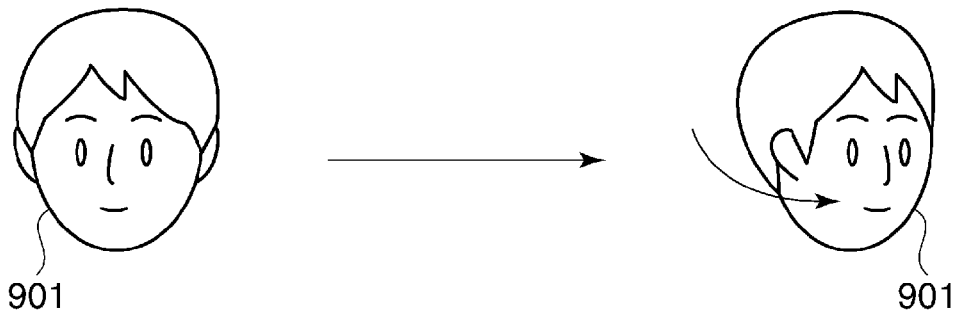
Figure 9B:
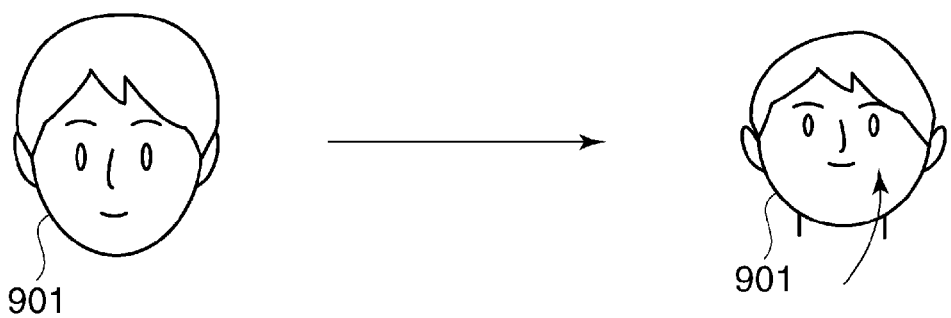
Figure 9C:
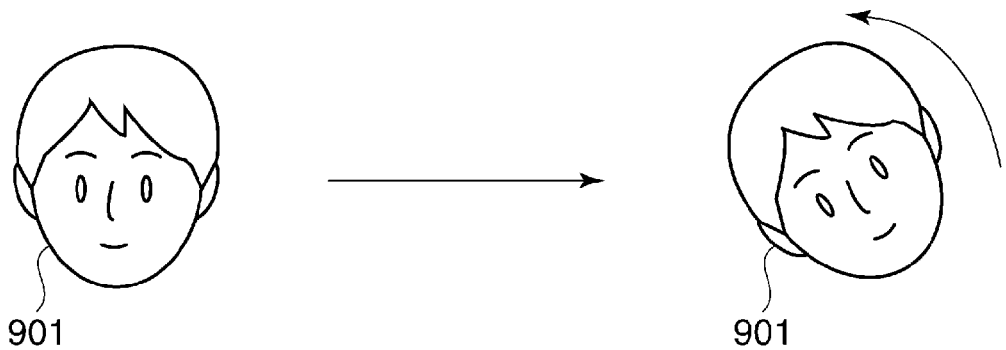

FIGS. 9A to 9C are views of examples of respective turning directions of an object 901. FIG. 9A shows an example of a turn in a yaw direction. FIG. 9B shows an example of a turn in a pitch direction, and FIG. 9C shows an example of a turn in a roll direction.

In the present example, a horizontal turn of the object 901, as shown in FIG. 9A, is a turn in the yaw direction (simplified as a "yaw direction turn"). Further, a vertical turn of the object 901, as shown in FIG. 9B, is a turn in the pitch direction (simplified as a "pitch direction turn"), and a laterally inclining turn of the object 901, as shown in FIG. 9C, is a turn in the roll direction (simplified as a "roll direction turn").

Figure 10A:
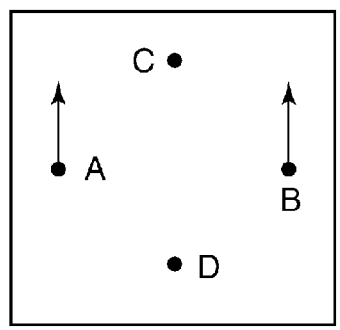
Figure 10B:
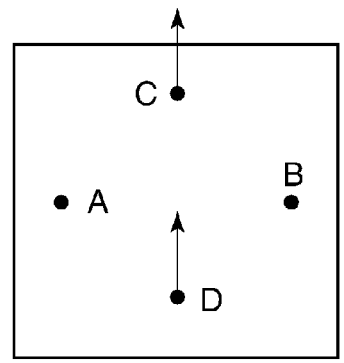
Figure 10C:
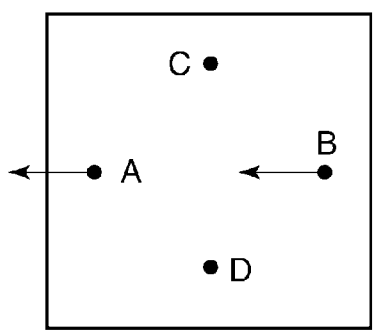
Figure 10D:
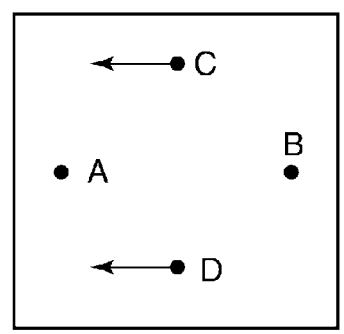
Figure 10E:
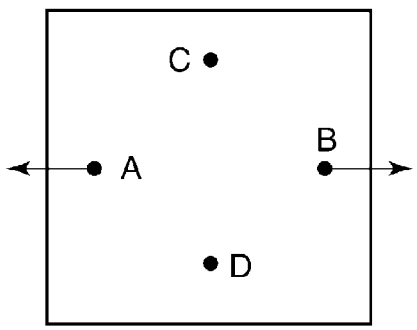
Figure 10F:
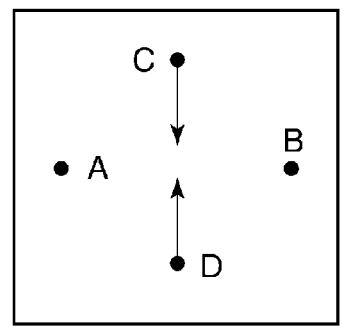
Figure 10G:
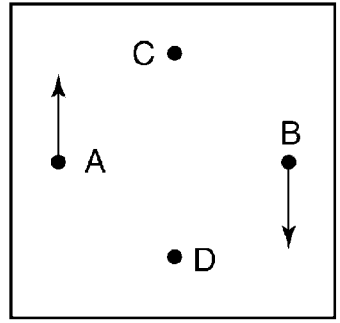
Figure 10H:
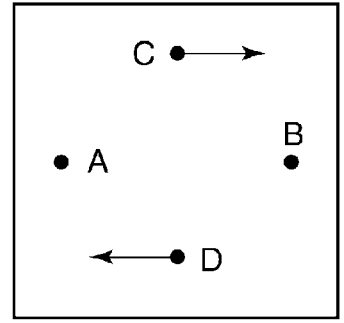

FIGS. 10A to 10H are views useful in explaining how the shape change determination section 106 performs determination as to a shape change. FIG. 10A shows motion vectors detected in association with small areas formed by vertical division (small vertically divided areas) when the object is performing a pitch direction turn, and FIG. 10B shows motion vectors detected in association with small areas formed by horizontal division (small horizontally divided areas) when the object is performing a pitch direction turn. FIG. 10C shows motion vectors detected in association with the small vertically divided areas when the object is performing a yaw direction turn, and FIG. 10D shows motion vectors detected in association with the small horizontally divided areas when the object is performing a yaw direction turn. FIG. 10E shows motion vectors detected in association with the small vertically divided areas when the size of the object is changing, and FIG. 10F shows motion vectors detected in association with the small horizontally divided areas when the size of the object is changing. FIG. 10G shows motion vectors detected in association with two of the small vertically divided areas when the object is performing a roll direction turn, and FIG. 10H shows motion vectors detected in association with two of the small horizontally divided areas when the object is performing a roll direction turn.

Referring to not only FIG. 6 but also FIGS. 10A to 10H, the shape change determination section 106 determines whether or not, between the small areas A and B, the y components of the respective two motion vectors A and B are equal in sign to each other and not equal to zero (step S304). If the y components of the respective two motion vectors A and B are either not equal in sign or equal to zero (NO to the step S304), the shape change determination section 106 determines whether or not, between the small areas C and D, the y components of the respective two motion vectors C and D are equal in sign to each other and not equal to zero (step S305).

If the y components of the respective two motion vectors A and B are equal in sign and not equal to zero as shown in FIG. 10A (YES to the step S304), the shape change determination section 106 provisionally determines that the object is performing a pitch direction turn. Consequently, the area correction section 107 performs a pitch correction process on the analogous area in which the object is provisionally determined as performing the pitch direction turn (step S306), as described hereinafter.

Similarly, if the y components of the respective motion vectors C and D are equal in sign and not equal to zero as shown in FIG. 10B (YES to the step S305), the shape change determination section 106 provisionally determines that the object is performing a pitch direction turn. Consequently, the area correction section 107 executes the pitch correction process in the step S306.

If it is determined in the step S305 that the y components of the respective motion vectors C and D are either not equal in sign or equal to zero (NO to the step S305), the shape change determination section 106 determines whether or not, between the small areas A and B, the x components of the respective two motion vectors A and B are equal in sign to each other and not equal to zero (step S307). Note that when the pitch correction process in the step S306 is terminated, the process proceeds to the step S307.

If the x components of the respective motion vectors A and B are either not equal in sign or equal to zero (NO to the step S307), the shape change determination section 106 determines whether or not, between the small areas C and D, the x components of the respective two motion vectors C and D are equal in sign to each other and not equal to zero (step S308).

If the x components of the respective motion vectors A and B are equal in sign and not equal to zero as shown in FIG. 10C (YES to the step S307), the shape change determination section 106 provisionally determines that the object is performing a yaw direction turn. Consequently, the area correction section 107 performs a yaw correction process on the analogous area in which the object is provisionally determined as performing the yaw direction turn (step S309), as described hereinafter.

Similarly, if the x components of the respective motion vectors C and D are equal in sign and not equal to zero as shown in FIG. 10D (YES to the step S308), the shape change determination section 106 provisionally determines that the object is performing a yaw direction turn. Consequently, the area correction section 107 executes the yaw correction process in the step S309.

If it is determined in the step S308 that the x components of the respective motion vectors C and D are either not equal in sign or equal to zero (NO to the step S308), the shape change determination section 106 determines whether or not, between the small areas A and B, the x components of the respective two motion vectors A and B are not equal in sign and not equal to zero (step S310). Note that when the yaw correction process in the step S309 is terminated, the process proceeds to the step S310.

If the x components of the respective motion vectors A and B are equal in sign or equal to zero (NO to the step S310), the shape change determination section 106 determines whether or not, between the small areas C and D, the y components of the respective two motion vectors C and D are not equal in sign and not equal to zero (step S311).

If the x components of the respective two motion vectors A and B are not equal in sign and not equal to zero as shown in FIG. 10E (YES to the step S310), the shape change determination section 106 provisionally determines that the size of the object is changing. Consequently, the area correction section 107 performs a size correction process on the analogous area in which the size of the object is provisionally determined as changing (step S312), as described hereinafter.

Similarly, if the y components of the respective motion vectors C and D are not equal in sign and not equal to zero as shown in FIG. 10F (YES to the step S311), the shape change determination section 106 provisionally determines that the size of the object is changing. Consequently, the area correction section 107 executes the size correction process in the step S312.

If the y components of the respective motion vectors C and D are either equal in sign or equal to zero (NO to the step S311), the shape change determination section 106 determines whether or not, between the small areas A and B, the x components of the respective two motion vectors A and B are equal to zero and the y components of these are not equal in sign and not equal to zero (step S313). Note that when the size correction process in the step S312 is terminated, the process proceeds to the step S313.

If the x components of the respective two motion vectors A and B are not equal to zero or the y components are equal in sign or equal to zero (NO to the step S313), the shape change determination section 106 determines whether or not, between the small areas C and D, the y components of the respective two motion vectors C and D are equal to zero and the x components are not equal in sign and not equal to zero (step S314).

If the x components of the respective motion vectors A and B are equal to zero and the y components are not equal in sign and not equal to zero as shown in FIG. 10G (YES to the step S313), the shape change determination section 106 provisionally determines that the object is performing a roll direction turn. Consequently, the area correction section 107 performs a roll correction process on the analogous area in which the object is provisionally determined as performing the roll direction turn (step S315), as described hereinafter.

Similarly, if the y components of the respective motion vectors C and D are equal to zero and the x components of these are not equal in sign and not equal to zero as shown in FIG. 10H (YES to the step S314), the shape change determination section 106 provisionally determines that the object is performing a roll direction turn. Consequently, the area correction section 107 executes the roll correction process in the step S315.

If the y components of the respective motion vectors C and D are not equal to zero or the x components of these are equal in sign or equal to zero (NO to the step S314), the shape change detection and correction process is terminated. Note that when the roll correction process in the step S315 is terminated, the shape change detection and correction process is terminated.

Although in the step S313, the determination conditions include the determination as to whether or not the x components of the respective motion vectors A and B are equal to zero and in the step S314, the determination conditions include the determination as to whether or not the y components of the respective motion vectors C and D are equal to zero, this is not limitative. It can be envisaged that the center position of the object in the turn in the roll direction is deviated from the center position of the reference area, and therefore a determination as to whether the vector components are not larger than a threshold value set small compared with the reference area may be included in the determination conditions in place of the determination as to whether or not the vector components are equal to zero.

Figure 11:
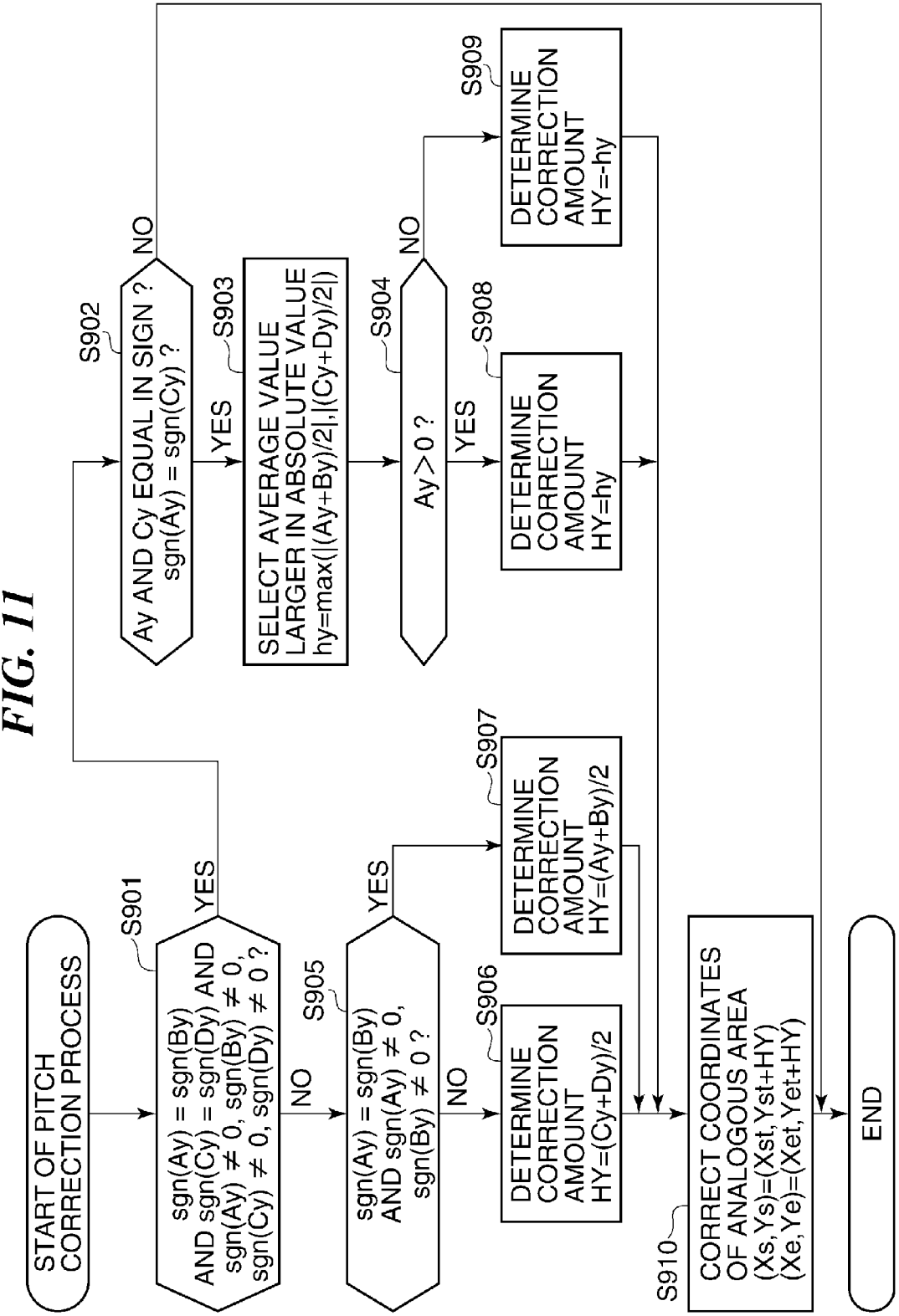
FIG. 11 is a flowchart of a pitch correction process executed by an area correction section appearing in FIG. 1.

FIG. 11 is a flowchart of the pitch correction process executed by the area correction section 107 appearing in FIG. 1 in the step S306 of the shape change detection and correction process in FIG. 6.

Referring to FIGS. 1 and 11, the pitch correction process is executed according to the sign of the y component of each of the motion vectors A to D in the respective small areas A to D, as described hereinbefore.

Figure 12A:
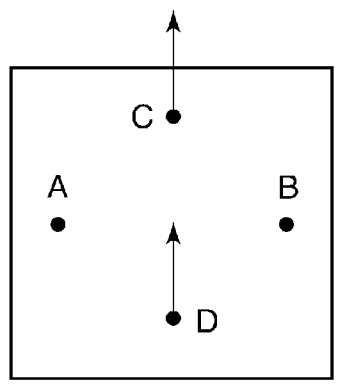
Figure 12B:
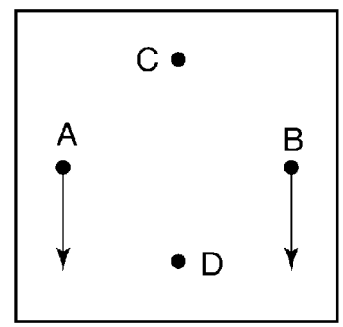
Figure 12C:
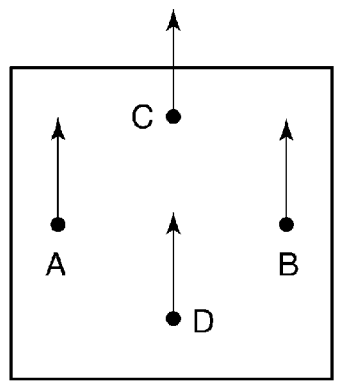
Figure 12D:
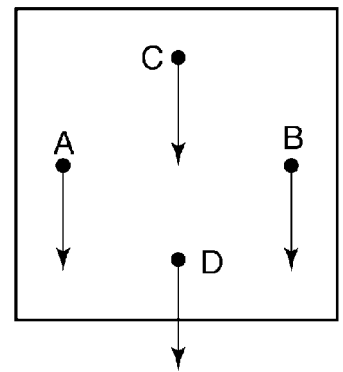
Figure 12E:
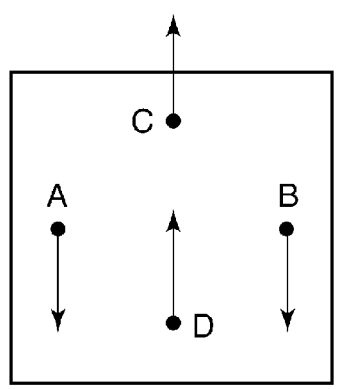
Figure 12F:
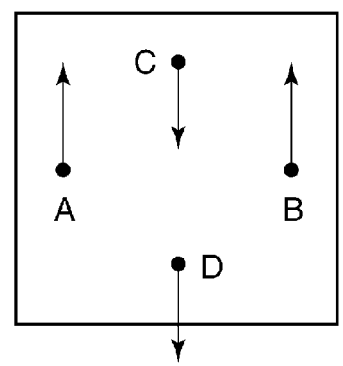

FIGS. 12A to 12F are views showing motion vectors before execution of the pitch correction process shown in FIG. 6. FIG. 12A shows a case where the two motion vectors C and D have the same sign (positive), and FIG. 12B shows a case where the two motion vectors A and B different from the motion vectors shown in FIG. 12A have the same sign (negative). FIG. 12C shows a case where the four motion vectors A to D have the same sign (positive), and FIG. 12D shows a case where the four motion vectors A to D have the same sign (negative). Further, FIG. 12E shows a case where the two motion vectors C and D have the same sign (positive) and the other two motion vectors A and B have the different sign (negative), and FIG. 12F shows a state opposite in sign to that in FIG. 12E.

Referring to not only FIG. 11 but also FIGS. 12A to 12F, when the pitch correction process is started, the area correction section 107 determines whether or not the y components (Ay and By) of the motion vectors A and B are equal in sign and the y components (Cy and Dy) of the motion vectors C and D are equal in sign, and whether the y components of the four motion vectors are not equal to zero (step S901).

If the y components of the motion vectors A and B are equal in sign and the y components of the motion vectors C and D are equal in sign, and the y components of the four motion vectors are not equal to zero (YES to the step S901), the area correction section 107 determines whether or not the y components (Ay and Cy) of the motion vectors A and C are equal in sign (step S902). FIGS. 12C to 12F show states in each of which the y components of the motion vectors A and B are equal in sign and the y components of the motion vectors C and D are equal in sign, and the y components of the four motion vectors are not equal to zero.

If the y components of the motion vectors A and C are not equal in sign (NO to the step S902), the area correction section 107 judges that a state exemplified in FIG. 12E or 12F has occurred, and determines that the object is not performing a pitch direction turn, followed by terminating the pitch correction process.

On the other hand, if the y components of the motion vectors A and C are equal in sign (YES to the step S902), the area correction section 107 judges that a state exemplified in FIG. 12C or 12D has occurred, and determines that the object is performing a pitch direction turn.

When it is determined that the object is performing a pitch direction turn, the area correction section 107 performs processing for determining a correction amount (first correction amount) by for correcting the coordinates of the analogous area, using the y components (Ay to Dy) of the motion vectors A to D. In the processing, the area correction section 107 calculates the average value of Ay and By and that of Cy and Dy, compares the absolute values of these average values, and selects one of the average values which is larger in absolute value (step S903).

Then, the area correction section 107 determines whether or not the y component (Ay) of the motion vector A is positive (step S904). In short, the area correction section 107 determines the sign of the correction amount.

On the other hand, if it is determined in the step S901 that the y components of the motion vectors A and B are not equal in sign, the y components of the motion vectors C and D are not equal in sign, or any of the y components of the four motion vectors is equal to zero (NO to the step S901), the area correction section 107 determines whether or not the y components of the motion vectors A and B are equal in sign and not equal to zero (step S905).

If the y components (Ay and By) of the motion vectors A and B are not equal in sign or equal to zero (NO to the step S905), i.e. if only the y components (Cy and Dy) of the motion vectors C and D are equal in sign and not equal to zero (see FIG. 12A), the area correction section 107 sets a pitch correction amount HY to (Cy+Dy)/2 (step S906).

If the y components (Ay and By) of the motion vectors A and B are equal in sign (YES to the step S905), i.e. if only the y components (Ay and By) of the motion vectors A and B are equal in sign (see FIG. 12B), the area correction section 107 sets the pitch correction amount HY to (Ay+By)/2 (step S907).

If it is determined in the step S904 that the y component (Ay) of the motion vector A is positive (YES to the step S904), the area correction section 107 sets the pitch correction amount HY to hy (step S908).

On the other hand, if the y component (Ay) of the motion vector A is not positive (NO to the step S904), the area correction section 107 sets the pitch correction amount HY to −hy (step S909).

Then, in a step S910, the area correction section 107 corrects the coordinates of the analogous area based on the pitch correction amount HY determined in one of the steps S906 to S910.

Now, assuming that a corrected analogous area is defined by the upper left coordinates (Xs, Ys) and the lower right coordinates (Xe, Ye), since the pitch correction amount is represented by HY and the analogous area is represented by the upper left coordinates (Xst, Yst) and the lower right coordinates (Xet, Yet), the corrected location of the analogous area is expressed by the following equations (5):

$$(Xs, Ys) = (Xst, Yst+HY)$$

$$(Xe, Ye) = (Xet, Yet+HY) \quad (5)$$

Thus, the area correction section 107 corrects the coordinates of the analogous area by the equations (5) (step S910), followed by terminating the pitch correction process.

Figure 13:
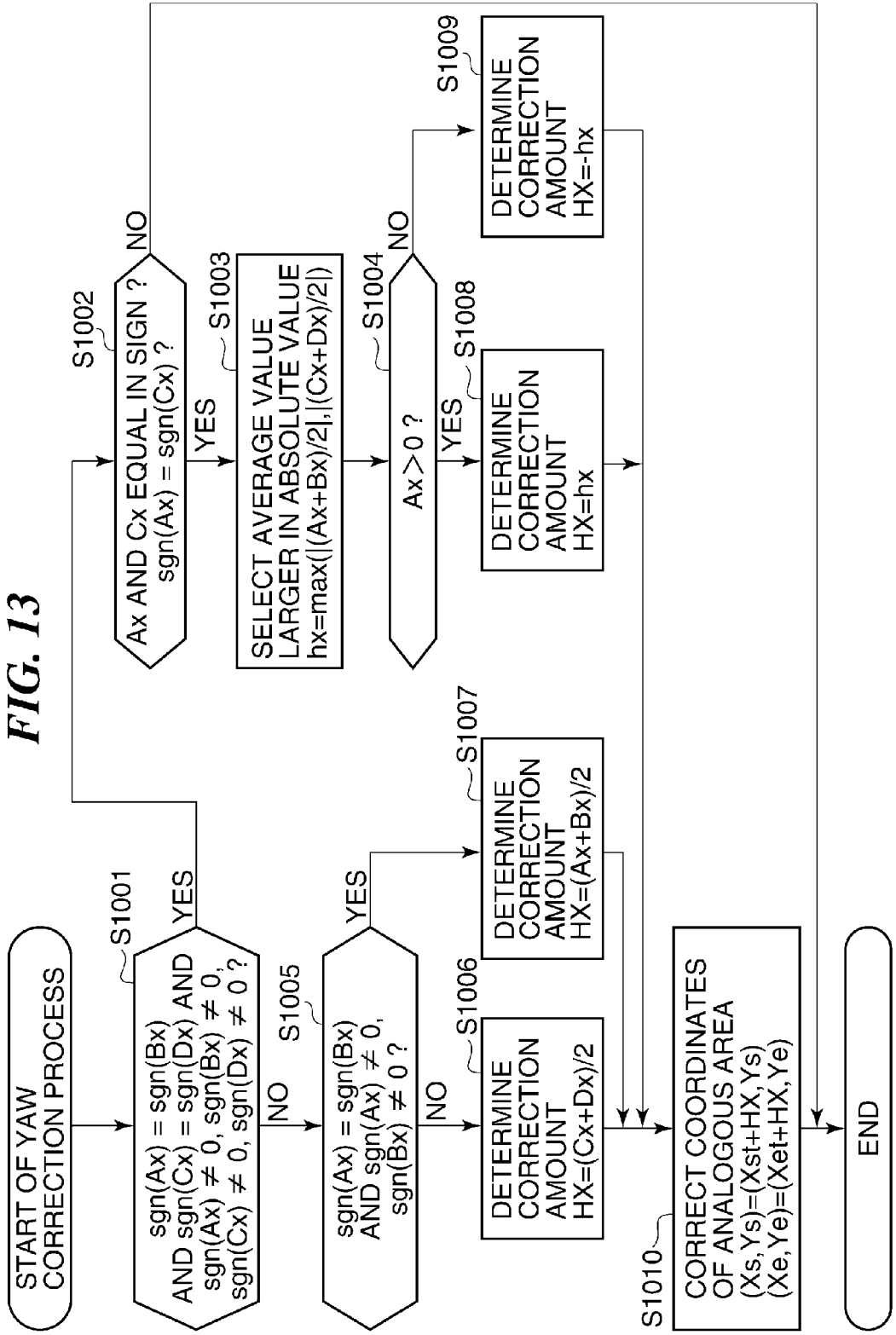
FIG. 13 is a flowchart of a yaw correction process executed by the area correction section appearing in FIG. 1.

FIG. 13 is a flowchart of the yaw correction process executed by the area correction section 107 appearing in FIG. 1 in the step S309 of the shape change detection and correction process in FIG. 6.

Referring to FIGS. 1 and 13, the yaw correction process is executed according to the sign of the x component of each of the motion vectors A to D associated with the respective small areas A to D. When the yaw correction process is started, the area correction section 107 determines whether or not the x components (Ax and Bx) of the motion vectors A and B are equal in sign and the x components (Cx and Dx) of the motion vectors C and D are equal in sign, and whether the x components of the four motion vectors are not equal to zero (step S1001).

If Ax and Bx are equal in sign and Cx and Dx are equal in sign, and the x components of the four motion vectors are not equal to zero (YES to the step S1001), the area correction section 107 determines whether or not Ax and Cx are equal in sign (step S1002). If Ax and Cx are not equal in sign (NO to the step S1002), the area correction section 107 determines that the object is not performing a yaw direction turn, followed by terminating the yaw correction process.

On the other hand, if Ax and Cx are equal in sign (YES to the step S1002), the area correction section 107 determines that the object is performing a yaw direction turn. When it is determined that the object is performing a yaw direction turn, the area correction section 107 executes processing for determining a correction amount (second correction amount) for correcting the coordinates of the analogous area, using Ay to Dy. In the processing, the area correction section 107 calculates the average value of Ax and Bx and that of Cx and Dx, compares the absolute values of these average values, and selects one of the average values which is larger in absolute value (step S1003). Then, the area correction section 107 determines whether or not Ax is positive (step S1004).

On the other hand, if it is determined in the step S1001 that Ax and Bx are not equal in sign or Cx and Dx are not equal in sign, or any of these four x components is equal to zero (NO to the step S1001), the area correction section 107 determines whether or not Ax and Bx are equal in sign and not equal to zero (step S1005).

If Ax and Bx are not equal in sign or equal to zero (NO to the step S1005), the area correction section 107 sets a yaw correction amount HX to (Cx+Dx)/2 (step S1006). If Ax and Bx are equal in sign (YES to the step S1005), the area correction section 107 sets the yaw correction amount HX to (Ax+Bx)/2 (step S1007).

If it is determined in the step S1004 that Ax is positive (YES to the step S1004), the area correction section 107 sets the yaw correction amount HX to hx (step S1008). On the other hand, if Ax is not positive (NO to the step S1004), the area correction section 107 sets the yaw correction amount HX to −hx (step S1009).

Then, the area correction section 107 corrects the coordinates of the analogous area such that (Xs, Ys)=(Xst+HX) and (Xe, Ye)=(Xet+HX, Ye) (step 1010), followed by terminating the yaw correction process.

Figure 14:
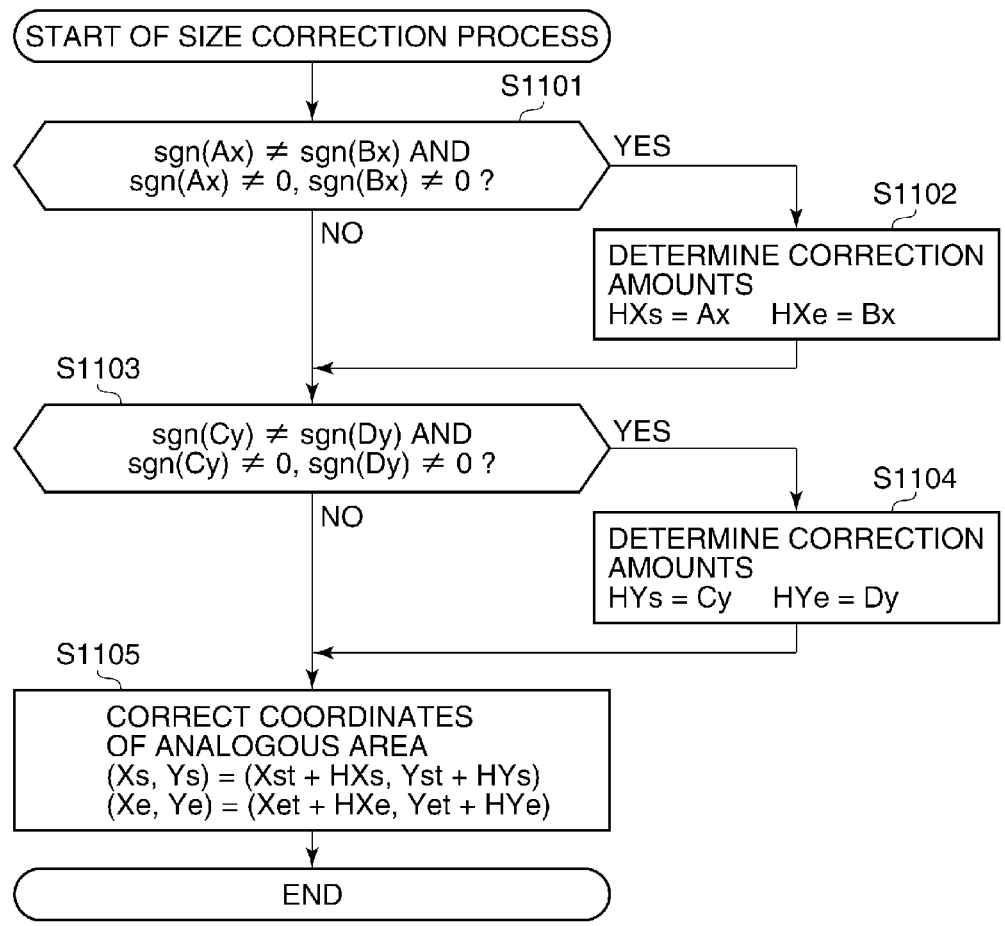
FIG. 14 is a flowchart of a size correction process executed by the area correction section.

FIG. 14 is a flowchart of the size correction process executed by the area correction section 107 appearing in FIG. 1 in the step S312 of the shape change detection and correction process in FIG. 6.

Referring to FIGS. 1 and 14, when the size correction process is started, the area correction section 107 determines whether or not Ax and Bx are not equal in sign and not equal to zero (step S1101). If Ax and Bx are not equal in sign and not equal to zero (YES to the step S1101), the area correction section 107 determines two correction amounts (third correction amounts) HXs and HXe necessary for correction of the x coordinates of the analogous area. In the present example, HXs=Ax and HXe=Bx are set (step S1102).

If Ax and Bx are equal in sign or any one of them is equal to zero (NO to the step S1101), the area correction section 107 determines whether or not Cy and Dy are not equal in sign and not equal to zero (step S1103). Note that when the step S102 is completed, the process proceeds to the step S1103.

If Cy and Dy are not equal in sign and not equal to zero (YES to the step S1103), the area correction section 107 determines two correction amounts (fourth correction amounts) HYs and HYe necessary for correction of the y coordinates of the analogous area. In the present example, HYs=Cy and HYe=Dy are set (step S1104). When the step S1104 is completed, the process proceeds to a step S1105, described hereinafter.

If Cy and Dy are equal in sign or any one of them is equal to zero (NO to the step S1103), since the correction amounts are represented by HXs and HXe and HYs and HYe, and the analogous area is represented by the upper left coordinates (Xst, Yst) and the lower right coordinates (Xet, Yet), the area correction section 107 sets the corrected coordinates of the analogous area as expressed by the following equations (6) (step S1105), followed by terminating the size correction process. Note that when the answers to the questions of the steps S1101 and S1103 are negative (NO), HXs and HXe and HYs and HYe are all equal to zero.

$(Xs, Ys)=(Xst+HXs, Yst+HYs)$ $(Xe, Ye)=(Xet+HXe, Yet+HYe)$ (6)

Figure 15:
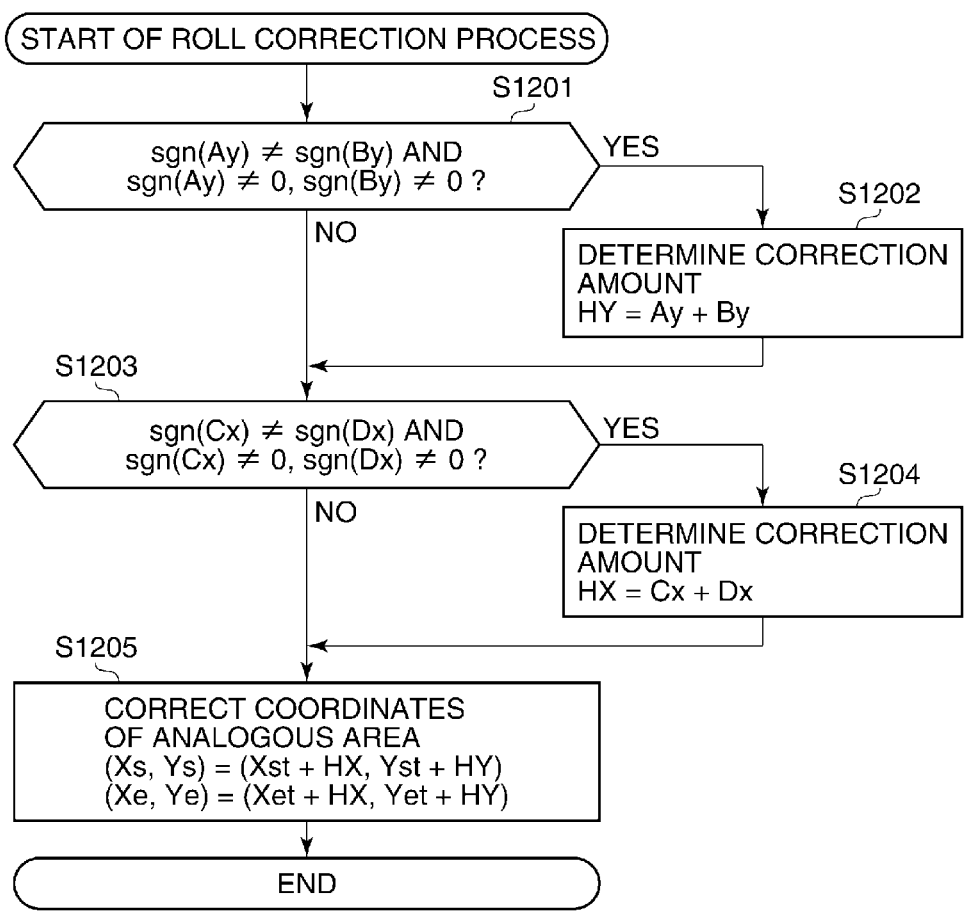
FIG. 15 is a flowchart of a roll correction process executed by the area correction section.

FIG. 15 is a flowchart of the roll correction process executed by the area correction section 107 appearing in FIG. 1 in the step S315 of the shape change detection and correction process in FIG. 6.

Referring to FIGS. 1 and 15, when the roll correction process is started, the area correction section 107 determines whether or not Ay and By are not equal in sign and not equal to zero (step S1201). If Ay and By are not equal in sign and not equal to zero (YES to the step S1201), the area correction section 107 determines a correction amount (fifth correction amount) HY necessary for correction of the y coordinates of the analogous area. In the present example, HY=Ay+By is set (step S1202).

If Ay and By are equal in sign or any one of them is equal to zero (NO to the step S1201), the area correction section 107 determines whether or not Cx and Dx are not equal in sign and not equal to zero (step S1203). Note that when the processing in the step S1202 is completed, the process proceeds to the step S1203.

If Cx and Dx are not equal in sign and not equal to zero (YES to the step S1203), the area correction section 107 determines a correction amount (sixth correction amount) HX necessary for correction of the x coordinates of the analogous area. In the present example, HX=Cx+Dx is set (step S1204). Note that when the processing in the step S1204 is completed, the process proceeds to a step S1205, described hereinafter.

If Cx and Dx are equal in sign or any one of them is equal to zero (NO to the step S1203), since the correction amounts are represented by HX and HY and the analogous area is represented by the upper left coordinates (Xst, Yst) and the lower right coordinates (Xet, Yet), the area correction section 107 sets the corrected coordinates of the analogous area as expressed by the following equations (7) (step S1205), followed by terminating the roll correction process. Note that when the answers to the questions of the steps S1201 and S1203 are negative (NO), HX and HY are both equal to zero.

$(Xs, Ys)=(Xst+HX, Yst+HY)$ $(Xe, Ye)=(Xet+HX, Yet+HY)$ (7)

After the pitch correction process, the yaw correction process, the size correction process, and the roll correction process are executed by the area correction section 107, the area update section 108 appearing in FIG. 1 feeds back the corrected analogous area to the tracking section 102 and updates the analogous area.

As described above, according to the present embodiment, even when the shape of an object as a tracking target changes, it is possible to track the object with high accuracy. More specifically, changes in turn and size of an object can be coped with, which makes it possible to track the object with high accuracy.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

For example, it is possible to cause the object tracking device to execute the functions of the above-described embodiment as an object tracking method. Further, the functions of the above-described embodiment may be realized by causing a computer provided in the object tracking device to execute an object tracking program provided with the functions of the above-described embodiment.

In this case, each of the object tracking method and the object tracking program includes at least a small area setting step, a motion vector detection step, a shape change determination step, an area correction step, and a tracking step. Note that the object tracking program is stored e.g. in a computer-readable storage medium.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

This application claims priority from Japanese Patent Application No. 2010-262514 filed Nov. 25, 2010, which is hereby incorporated by reference herein in its entirety.

What is claimed is:

1. An object tracking device that receives an image signal having a plurality of frame images and tracks a specific object in the image signal, comprising:
a detection unit configured to detect, in a current frame image, an analogous area having a feature value most approximate to that of a reference area, the reference area being indicative of and covering an area where an image of the object is formed in a portion of a preceding frame image preceding the current frame image;
a small area-setting unit configured to set a predetermined number of small areas in the reference area;
a motion vector detection unit configured to detect a motion vector of the object in each of the small areas;
a shape change determination unit configured to determine a change of the object, related to a change in orientation of the object, according to the motion vector to thereby obtain shape change information;
an area correction unit configured to correct a location and a size of the analogous area according to the shape change information to thereby correct the analogous area to a corrected analogous area in the current frame image; and
a tracking unit configured to track the object using the corrected analogous area.

2. The object tracking device according to claim 1, comprising a reference area storage unit configured to store location information on the reference area in the preceding frame image and image data associated with the reference area.

3. The object tracking device according to claim 1, wherein said shape change determination unit determines the change of the object according to respective signs of x and y components of the motion vector.

4. The object tracking device according to claim 1, wherein said area correction unit corrects the location and size of the analogous area in the current frame image according to values of the x and y components of the motion vector.

5. An object tracking method for use in an object tracking device that receives an image signal having a plurality of frame images and tracks a specific object in the image signal, comprising:
detecting, in a current frame image, an analogous area having a feature value most approximate to that of a reference area, the reference area being indicative of and covering an area where an image of the object is formed in a portion of a preceding frame image preceding the current frame image;
setting a predetermined number of small areas in the reference;
detecting a motion vector of the object in each of the small areas;
determining a change of the object, related to a change in orientation of the object, according to the motion vector to thereby obtain shape change information;
correcting a location and a size of the analogous area according to the shape change information to thereby correct the analogous area to a corrected analogous area in the current frame image; and
tracking the object using the corrected analogous area.

6. A non-transitory computer-readable storage medium storing a computer-executable object tracking program for causing a computer to execute an object tracking method for use in an object tracking device that receives an image signal having a plurality of frame images and tracks a specific object in the image signal,
wherein the object tracking method comprises:
detecting, in a current frame image, an analogous area having a feature value most approximate to that of a reference area, the reference area being indicative of and covering an area where an image of the object is formed in a portion of a preceding frame image preceding the current frame image;
setting a predetermined number of small areas in the reference area;
detecting a motion vector of the object in each of the small areas;
determining a change of the object, related to a change in orientation of the object, according to the motion vector to thereby obtain shape change information;
correcting a location and a size of the analogous area according to the shape change information to thereby correct the analogous area to a corrected analogous area in the current frame image; and
tracking the object using the corrected analogous area.

* * * * *